United States Patent [19]

Farris et al.

[11] Patent Number: 4,982,473

[45] Date of Patent: Jan. 8, 1991

[54] WIRE ROPE CLEANING APPARATUS

[75] Inventors: Charles J. Farris; Joseph E. Whitlow; Paul E. Sitzes, all of Sedalia, Mo.

[73] Assignee: AMSTED Industries Incorporated, Chicago, Ill.

[21] Appl. No.: 197,519

[22] Filed: May 23, 1988

[51] Int. Cl.$^5$ .............................................. B66B 7/12
[52] U.S. Cl. ...................................... 15/256.6; 15/88; 15/104.04; 118/DIG. 21; 134/9
[58] Field of Search ..................... 15/88, 256.6, 104.04; 184/15.1; 134/9; 118/DIG. 11, DIG. 21, DIG. 22

[56] References Cited

U.S. PATENT DOCUMENTS 4,570,285  2/1986  Skelton .............................. 15/256.6

FOREIGN PATENT DOCUMENTS 316318  11/1956  Switzerland .
858832  1/1961  United Kingdom ............... 15/256.6

Primary Examiner—Edward L. Roberts
Attorney, Agent, or Firm—Charles E. Bouton; Edward J. Brosius

[57] ABSTRACT

Wire rope is cleaned or otherwise treated during operation in a system or machine by surrounding the wire rope with a plurality of tools at a location fixed along the wire rope path, and causing the tools to spin around the wire rope by positioning followers to track in the valleys between outer helical strands of the wire rope.

15 Claims, 4 Drawing Sheets

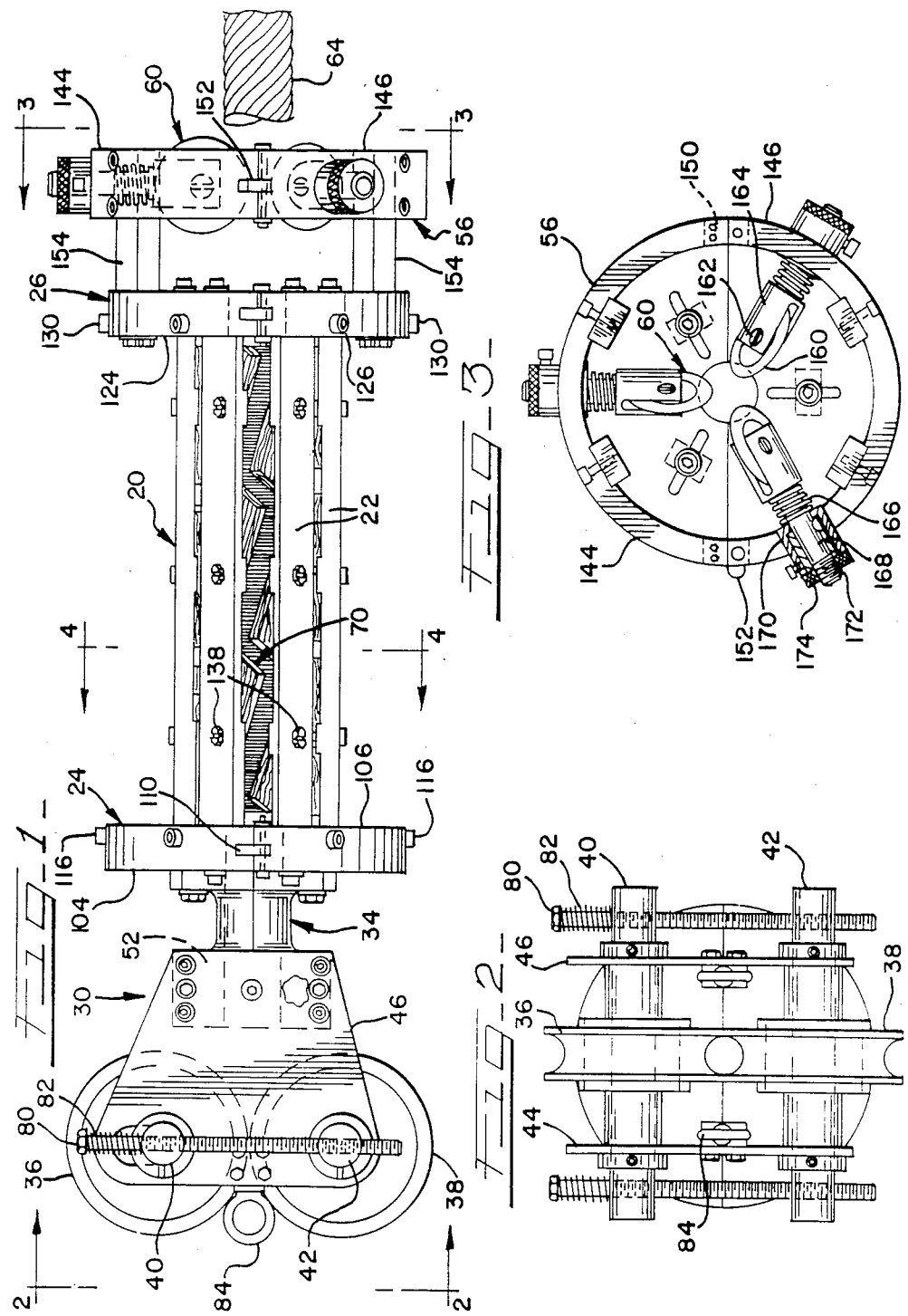

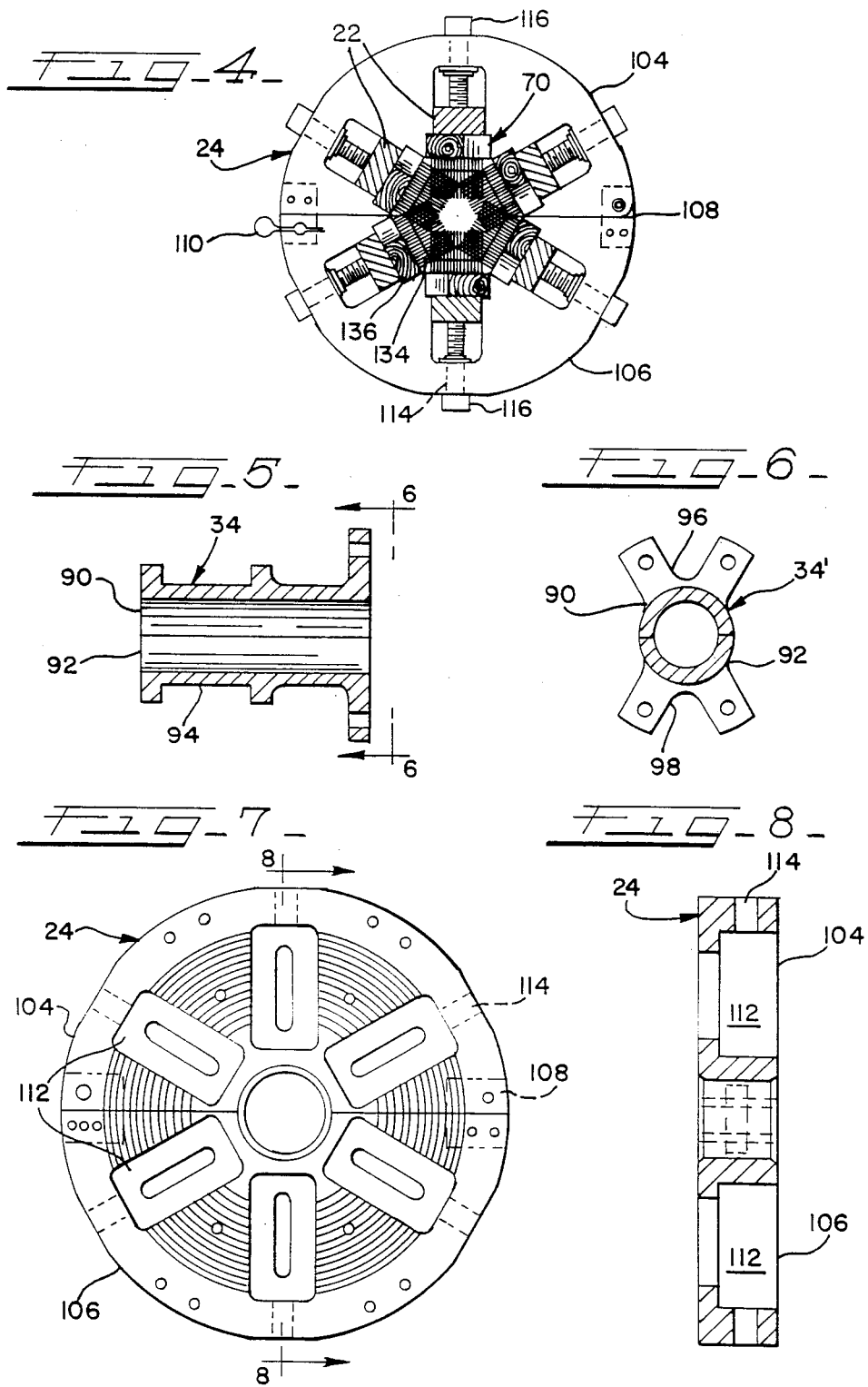

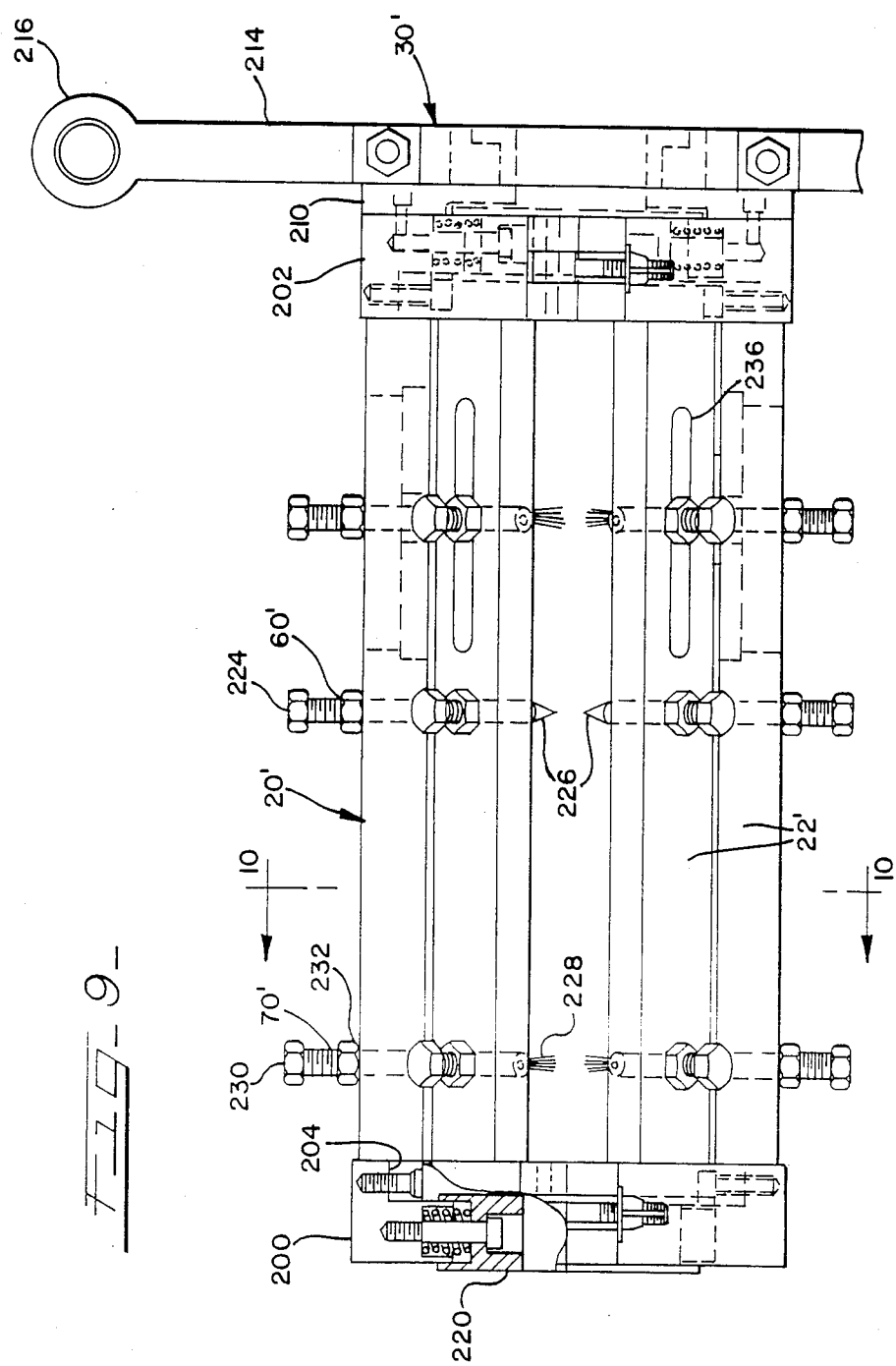

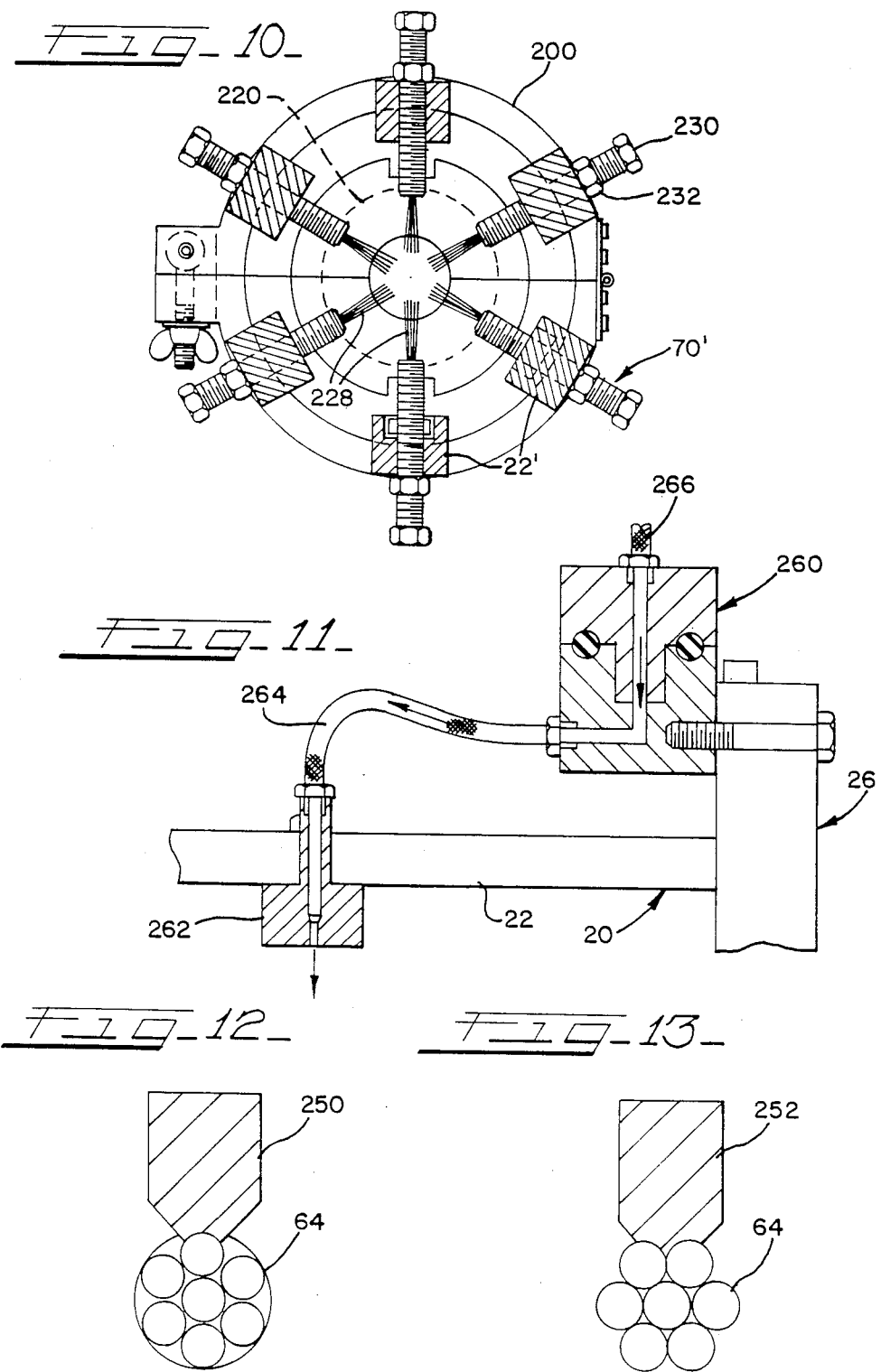

WIRE ROPE CLEANING APPARATUS

FIELD OF INVENTION

The present invention deals generally with a method and apparatus for contact treating the surface of wire rope and more specifically is directed to an improved method and apparatus for cleaning wire rope while the rope is operational as a part within a system or machine.

BACKGROUND OF THE INVENTION

Wire rope is frequently employed as a means to transmit power and or motion within a system such as a ski-lift or elevator or within a machine such as a power shovel, and the like. Often the wire rope in such a system or machine collects dirt or debris on its outer surface as it is operational, that is during the periods that the wire rope is moved therein, and this way be further aggravated because such dirt and debris is attracted to and held by lubricant that is normally required to be present on the wire rope.

In some situations the wire rope is cleaned and possibly relubricated only at times the system or machine is inoperative and shut down for maintenance; and conversely it has often been the case that the rate at which the wire rope has become dirty established a maintenance schedule. Clearly it would be a great advantage to decrease the need to shut down and extend the operational periods of such systems and machines employing wire rope.

SUMMARY OF THE PRESENT INVENTION

Accordingly, it is a principal object of the present invention to provide an improved method and apparatus for treating wire rope while it is operational and without interrupting the functioning of a system or machine in which the wire rope is involved.

Another object of the present invention is to provide an improved method and apparatus for cleaning the surface of wire rope while the wire rope is in operation as a part of a system or machine.

It is a further object of the present invention to provide an improved method and apparatus for scraping and/or brushing the outwardly exposed surfaces of the wire rope strands making up the outer layer of an operational wire rope in synchronism with the lay of those strands.

It is yet another object of the present invention to provide a method and apparatus for applying an agent, such as a lubricant, to the outer surface of an operational wire rope.

Briefly stated the present invention involves spinning a plurality of treatment tools around a wire rope, while maintaining the tools in contact with the rope surface, at a fixed location along the path of the wire rope while it is operational and moving in a system or machine. An apparatus devised to perform the method comprises a cage means mountable upon a wire rope with a plurality of tools extending inwardly from the cage, a follower means fixed to the cage and tracking the surface strands of wire rope to cause the cage to spin with the strands, and a yoke means rotatably connected to the cage means to anchor the cage at a fixed location along the path of the wire rope.

BRIEF DESCRIPTION OF THE DRAWINGS

Further objects and advantages will become apparent upon reading the following detailed description of the invention in conjunction with the drawings wherein:

FIG. 1 is a side elevation of a preferred embodiment of an apparatus incorporating the present invention;

FIG. 2 is an end view taken at line 2—2 of FIG. 1;

FIG. 3 is an opposite end view taken at line 3—3 in FIG. 1;

FIG. 4 is a sectional view taken at line 4—4 in FIG. 1;

FIG. 5 is a sectional side elevation of a portion of the apparatus of FIG. 1;

FIG. 6 is an end view taken at line 6—6 in FIG. 5;

FIG. 7 is a detailed end view of another portion of the apparatus of FIG. 1; FIG. 8 is a sectional side elevation taken at line 8—8 in FIG. 7; FIG. 9 is a side elevation of another embodiment of apparatus incorporating the present invention;

FIG. 10 is a sectional end view taken at line 10—10 in FIG. 9;

FIG. 11 is a detailed partial view of an apparatus to apply an agent to the surface of wire rope;

FIG. 12 is a detail view of a wire rope surface treating tool that may be utilized in either embodiment of apparatus; and FIG. 13 is a detail view of another wire rope surface treating tool.

DETAILED DESCRIPTION

According to the present method it is intended to arrange a plurality of tools about a wire rope at a zone fixed along the wire rope path, such as in a ski lift system or the like, and as the wire rope is drawn through the zone to cause the tools to spin around the wire rope, preferably in synchronism with the lay or twist rate of the outer strands making up the outer surface of the wire rope. In this manner the tools will be caused to track with the wire rope outer strands and may be extended into continuous contact with valleys between strands as well as the outermost surfaces of the wire rope strands.

Spinning of the tools is accomplished by arranging the tools radially about the wire rope path and connecting them to one or more followers which are caused to ride in the valleys between strands. At the same time the followers, and tools, are held to a fixed axial location along the path of the wire rope, and prevented from being moved axially therewith, whereby the followers and tools will be rotated and move circularly around the wire rope as the rope is moved axially past or through the fixed position.

As will be seen in the FIGURES illustrating the apparatus, positioning of the tools and connection between tools and follower is advantageously provided by a cage means which encompasses the wire rope path, thereby defining a zone around a wire rope, and which cage means is rotatably connected to a yoke means by which it may be anchored at a desired location along the wire rope path.

Furthermore, as shown in the FIGURES, the tools may alternatively comprise brushing, scraping and surface applying (such as lubricating) elements in the form of brushes, scrapers and wipers; and it is possible to utilize such elements separately or in combination as may be required by the condition of the wire rope.

A preferred apparatus embodiment is illustrated in FIGS. 1-8 wherein a cage generally 20 is comprised of a plurality of longitudinal slats 22 connected between forward and rearward encirclements generally 24,26, and is rotatably connected at the forward encirclement to a yoke generally 30 by a hollow bearing generally 34. The yoke 30 comprises a pair of aligned sheaves 36, 38 rotatably mounted on shafts 40, 42 extending between a pair of plates 44, 46 so as to form a pinch area aligned with the axis of the cage 20. Also fastened between plates 44, 46, slightly spaced from the sheaves 36, 38, is a bearing block 52 which rotatably receives an end of the hollow bearing 34.

At the opposite end of the cage generally 20 connected rearwardly of the rearward encirclement generally 26 is follower ring generally 56 which holds a plurality of followers generally 60 extending radially inwardly toward the axis of the cage 20.

It will be understood that the foregoing described elements are mounted so as to encompass a wire rope 64 which extends along an axial path through the pinch area between the sheaves 36, 38, thence through the hollow bearing 34 and through the cage 20 and follower ring generally 56 where the wire rope is engaged by the followers generally 60. A plurality of tools generally 70 are adjustably secured to the cage slats 22 and extending radially inwardly toward the cage axis (and wire rope - extending axially through the cage 20).

Looking further to FIGS. 1 and 2 it will be seen that shaft 40, 42 for sheaves 36, 38 are adjustably mounted by bolts 80 and springs 82 to permit adaption to various wire rope diameters. Also each plate 44, 46 of the yoke 30 includes an eye bolt 84 by which the yoke may be anchored in place by chains or the like (not shown) so as to not move with the wire rope.

As shown in FIGS. 5 and 6 the hollow bearing generally 34 connecting yoke 30 to cage 20 is comprised of two symmetrical semi-cylinders 90, 92 having an exterior race way 94, which is received in the bearing block 52 fastened to yoke 30, and bifurcated flanges 96, 98 which are fastened, by bolts or the like, to the forward encirclement 24.

The forward encirclement generally 24 is shown in detail in FIGS. 7 and 8 and is also seen in FIG. 4. It is comprised of two semicircular plates 104, 106 which are pivotally connected at one side by a hinge piece 108 and secured by a removable pin 110 at an opposite side. Each semicircular plate contains a plurality of pockets 112 each having outwardly extending holes 114 for adjustment bolts 116 which are fastened against the forward ends of respective slats 22.

The slats 22 extend between the forward encirclement 24 and the rearward encirclement 26, which is similarly constructed of two semicircular plates 124, 126 that are hinged together and which contain slat pockets and adjustment bolts 130. The tools generally 70 shown in FIGS. 1 and 4 are metal brushes 134 mounted on wooden backings 136 which are secured by screws 138 at an angle to the slats 22 which angle is preferably set to match the lay or angle of the strands on the wire rope 64 being cleaned.

It will be apparent that a variety of tools generally 70 may be substituted for the brushes 134 with only slight modification required in the manner of mounting from slats 22. Some tool alternatives are shown in FIGS. 11-13 and are described hereinafter.

The follower ring 56 of the preferred embodiment, as best seen in FIG. 3, is made up of two arcuate ring sections 144 and 146 which are pivotally connected by a hinge 150 at one side and secured by a pin 152 at the opposite side. It is to be noted that the hinges of each of the forward and rearward encirclements 24, 26 and the follower ring 56 are aligned at the same side of the cage generally 20, so that the entire cage is divided into two halves which may be opened.

Also as shown in FIGS. 1 and 3 each ring section 144, 146 is spaced from but rigidly attached to a corresponding semicircular plate 124, 126 (of the rearward encirclement 26) by two support bars 154.

The followers generally 60 mounted to the follower ring generally 56 will be seen to each comprise a narrow profile roller 160 (having a V shaped cross section) held radially inward of a ring section 144 or 146 by a pin 162 in a bifurcated holder 164, which holder is pivotably and reciprocally mounted against a compression spring 166 on a shaft 168. In turn each shaft 168 extends outwardly through a sleeve 170 mounted in a ring section 144, 146, and male threads 172 on the shaft 168 are engaged by internal threads of a cap 174 which is fitted within the sleeve 170. Accordingly, each roller 160 is adjustable radially and will be resiliently held against a wire rope 64 extending through the cage 20. The shaft 168—holder 164 interconnection permits the roller 160 to freely twist and thereby become seated in a valley between two adjacent wire rope strands. Thus as a wire rope 64 moves axially through the cage 20 and follower ring 56, the follower rollers 160 will track the wire rope strands and impart a rotary or spinning motion to the follower ring 56 and thereby to the entire cage generally 20. As this occurs the tools 70, such as brushes 134, mounted to the slats 22 of the cage 20 will also follow the outer surface strands of the wire rope 64 to thereby effectively contact all of the surface area thereof.

A second simplified apparatus embodiment is shown in FIGS. 9 and 10. In that embodiment a cage generally 20' is comprised of a plurality of slats 22' extending between two hinged end collars 200, 202 having open centers. Each slat 22' is simply directly fastened, by screws or the like, at each end to an inwardly extending lip 204 of each collar.

At one end the collar 202 holds an annular split bearing (not shown) and a rotatable face plate 210 fits outwardly of the collar 202 with an internal hollow hub (also not shown) held within the annular split bearing. The face plate 210 and hub are similarly split so as to facilitate placement about a wire rope. A yoke 30' comprising a simple cross bar 214 with eyelets 216 at each end is secured to the face plate.

The opposite collar 200 surrounds a hollow split hub 220 which centers the cage 20' on a longitudinally extending wire rope.

Followers generally 60' are mounted directly to the centers of slats 22' and may take the form of threaded bolts 224 having pointed stylus ends 226 which function to both track the wire rope strands and clean debris from the strand valleys. The tools 70' are also directly mounted to the slats and may take the form of brushes 228 extending from the ends of adjustable bolts 230. Both sets of bolts 224 and 230 may be secured so as to be adjustable radially of the cage 20' by lock nuts 232.

Preferably in the second embodiment one set of tools 70' which encircle the wire rope path, is also made longitudinally adjustable by providing slots 236 in each slat 22'

In FIGS. 12 and 13 alternate forms of tools are shown. Instead of brushes the tools in either embodiment may take the form of scrapers 250 or 252 which are shaped to the contour of one or two adjacent strands. It is also possible to provide other contours as may be found to be advantageous. In FIG. 11 a form of tool illustrated for applying an agent to a wire rope surface. In this alternative a rotary fluid coupling generally 260 is mounted on an encirclement generally 24 or 26 of the preferred embodiment (or a collar 200 or 202 of the second embodiment) and a plurality of wiper tools 262 are mounted to the slats 22 of a cage generally 20. Fluid conduits 264 are connected between the wiper 262 and the inner rotary portion of coupling 260 and another conduit 266 is connected between a stationary outer portion of the coupling 260 and a source of appropriate fluid (not shown) such as a lubricant.

The foregoing details have been provided to describe the best mode of the invention and still further variations and modifications may be made without departing from the spirit and scope of the invention which is defined in the following claims.

What is claimed is:

1. An improved apparatus for treating the surface of wire rope comprised of plural twisted strands while the wire rope is operational, said apparatus comprising:
    cage means having two spaced ends each with central openings to receive a wire rope and permit the wire rope to move through said cage means;
    follower rollers connected to said cage means and extending inwardly thereof into contact with the valleys between strands of said wire rope;
    a plurality of tools ranged within said cage means and extending inwardly thereof into functional engagement with the outer surface of said wire rope;
    and yoke means rotatably connected to said cage means whereby to anchor said apparatus at a fixed location along the path of said wire rope and while permitting said cage means to spin around said wire rope as said follower rollers track said strands.

2. The apparatus of claim 1 wherein said follower rollers are connected to said cage means outside one of said spaced ends and opposite said yoke means.

3. The apparatus of claim 1 wherein at least some of said tools are brushes.

4. The apparatus of claim 1 wherein at least some of said tools are scrapers.

5. The apparatus of claim 1 wherein at least some of said tools are wipers connected to deliver an agent to the surface of said wire rope.

6. The apparatus of claim 1 wherein at least some of said tools are mounted so as to be adjustable axially of said wire rope.

7. An improved apparatus for treating the surface of wire rope comprised of plural twisted strands while the wire rope is operational, said apparatus comprising:
    a plurality of slats arranged parallel and spaced equidistant to an axial path of wire rope, said slats extending between two encircling members placed radially to said path and having openings for the wire rope to pass therethrough;
    a plurality of tools mounted to said slats, said tools being ranged around said path and extending thereto into contact with a wire rope movable through said encircling members;
    a yoke rotatably connected to an encircling member to anchor said apparatus at a fixed location along said path;
    and a plurality of follower rollers connected to one of said slats and said encircling members, said follower rollers extending radially to said path and into contact with the valleys between strands of a wire rope movable through said path whereby to cause said slats to revolve about said wire rope.

8. The apparatus of claim 7 wherein said follower rollers are connected to a ring which is secured to an encircling member opposite said yoke.

9. The apparatus of claim 8 wherein each of said encircling members and said ring are hinged at one side so as to be openable.

10. The apparatus of claim 7 wherein each of said follower rollers are rotatably mounted within a holder which is in turn reciprocally and pivotably mounted on a shaft extending radially toward said path.

11. The apparatus of claim 10 wherein each said shaft is connected to extend inwardly of a ring which is secured to an encircling member opposite said yoke.

12. The apparatus of claim 7 wherein at least some of said tools are mounted to said slats so as to be adjustable axially of said paths.

13. The apparatus of claim 7 wherein at least some of said tools are brushes.

14. The apparatus of claim 7 wherein at least some of said tools are scrapers.

15. The apparatus of claim 7 wherein at least some of said tools are wipers connected to deliver an agent to the surface of wire rope.

* * * * *